United States Patent [19]
Vincent

[11] Patent Number: 5,976,588
[45] Date of Patent: *Nov. 2, 1999

[54] FOOD PACKAGE WITH FILLING NOZZLE

[75] Inventor: Michael James Vincent, Pleasanton, Calif.

[73] Assignee: Dreyer's Grand Ice Cream, Inc., Union City, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/706,615

[22] Filed: Sep. 5, 1996

[51] Int. Cl.⁶ .................................................. F25C 1/24
[52] U.S. Cl. ........................... 426/119; 426/515; 249/98; 249/130; 249/176; D15/90
[58] Field of Search .................................... 426/119, 515, 426/389, 524, 393, 115; 249/98, 176, 119, 61, 127, 130; 206/564; 220/555; D15/90

[56] References Cited

U.S. PATENT DOCUMENTS

| | | | |
|---|---|---|---|
| D. 190,839 | 7/1961 | Voigtmann | 67/3 |
| 1,407,614 | 2/1922 | Wicks . | |
| 2,447,281 | 8/1948 | Schneir | 226/93 |
| 2,587,852 | 3/1952 | Jahn et al. | 62/108.5 |
| 2,657,998 | 11/1953 | Peters | 99/171 |
| 3,021,695 | 2/1962 | Voigtmann | 62/370 |
| 3,120,112 | 2/1964 | Davis | 62/369 |
| 3,143,866 | 8/1964 | Frohbieter | 249/119 |
| 3,530,917 | 9/1970 | Donovan | 150/5 |
| 3,685,717 | 8/1972 | Seiferth et al. | 229/2.5 |
| 4,023,768 | 5/1977 | Herrera-Casasus | 249/81 |
| 4,081,122 | 3/1978 | Hobson | 229/2.5 EC |
| 4,222,547 | 9/1980 | Lalonde | 249/120 |
| 4,480,781 | 11/1984 | Emery et al. | 206/521.1 |
| 5,123,527 | 6/1992 | Hustad | 206/45.31 |
| 5,393,032 | 2/1995 | Cederroth | 249/61 |
| 5,503,858 | 4/1996 | Reskow | 426/119 |

*Primary Examiner*—David Lacey
*Assistant Examiner*—Hao Mai
*Attorney, Agent, or Firm*—Dorr, Carson, Sloan & Birney, PC

[57] ABSTRACT

A novel food service package for containing a frozen concentrate for use in quick blending a drink of individual proportion is disclosed. The food service package of the present invention has a number of equally sized compartments with formed channels separating the compartments. Channels are formed under the dividers in the bottom of the package to provide a large surface are for rapid heat exchange so as to quickly temper the frozen concentrate in the package. A raised dome region is formed in the center of the package for rapidly dispersing the product dispensed from a single nozzle into each of the compartments. A gutter formed in each divider causes the dispensed concentrate to overflow from the compartments so as to rapidly self-level in the package.

13 Claims, 8 Drawing Sheets

FOOD PACKAGE WITH FILLING NOZZLE

BACKGROUND OF THE INVENTION

1. Field of the Invention

The present invention relates to the field of frozen food packaging and, more particularly, to a package used for making a quick blend drink of individual portion from a frozen concentrate in the package and from a fluid mixed together in a blender.

2. Statement of the Problem

A popular drink is the "smoothie." A "smoothie" can typically be ordered from a health foods store (or made at home) by blending fruit (such as strawberries), ice and milk together. This creates an icy, refreshing and healthy drink. Commercial establishments maintain an inventory of fresh fruit, ice, and milk. The preparer has to handle the fruit which may include trimming bad areas. From sanitation and safety viewpoints, it is undesirable to have preparers handle fruit, use knives or other sharp instruments, and manually prepare a "smoothie." It also takes considerable time to prepare such a drink from scratch. Also, the size of individual portions and the quality of the drink served to customers may vary from preparer to preparer or even with the same preparer.

A need exists to enable a commercial establishment to prepare quickly a "smoothie" in a sanitary and safe environment and, yet, achieve the fresh, icy experience of a manually prepared drink. A need also exists to control the precise measure of the fruit, of the ice and of the milk into the. blender so that uniformity over the portion size and quality is maintained. A need exists to eliminate storing of fresh fruit by delivering the fruit in a frozen concentrate to the commercial establishment (or home) in a single portion frozen concentrate package that can be quickly tempered and wherein the concentrate can be rapidly released from the package. A further need exists, at the location where the frozen concentrate package is filled, to provide a package that can be rapidly filled to uniform levels through selfleveling with a single dosing nozzle in a multi-compartmented package.

A patentability search on these needs was conducted which resulted in the following patents. The provision of a valley or depression between trays or compartments to self-level fluid is shown in the following patents: Jahn 2,587,852, Voigtmann 3,021,695 and Des. 190,839, Davis 3,120,112, LaLonde 4,222,547, and Hobson 4,081,122. The provision of a spacing between the bottom and sides of compartments in a tray so as to speed up release of frozen product is shown in the following patents: Wicks 1,407,614, Herrera-Casasus 4,023,768, and Cederroth 5,393,032. The use of a plastic seal over a plurality of compartments carrying food product is shown in the following patents: Peters 2,657,998, Donovan 3,530,917, Hustad 5,123,527, Cederroth 5,393,032 and Reskow 5,503,858. The following patents set forth the formation of compartments in a tray through a thermal plastic process: Donovan 3,530,917 and Seiferth 3,685,717. The Schneir 2,447,281 patent sets forth a unique cover to permit simultaneous filling of a number of compartments which is in contrast with the Peters 2,657,998 patent which requires separate fillers to fill the compartments. The following patents show a compartmented tray which upon twisting releases frozen product: Jahn 2,587,852, Peters 2,657,998, Voigtmann 3,021,695, Donovan 3,530,917, Herrera-Casasus 4,023,768, and LaLonde 4,222,547. None of the patents discussed above provide a solution to the entire problem as set forth next which satisfies all of the needs expressed above.

3. Solution to the Problem

The present invention provides a package containing a frozen concentrate in a predetermined dose or measure. The package has a plurality of equally sized-compartments with defined edges. The plurality of compartments in the package are spaced from each other by dividers formed in the top of the package with the dividers forming deep and wide tempering channels in the bottom of the package. The channels expose a large surface area in the bottom and the compartment sides of the package for rapid tempering of the frozen concentrate. The dividers between the compartments have formed gutters so as to allow the concentrate, in liquid form, to self-level upon filling. A plastic film seals the top of the package after filling.

According to the method of the present invention, a blender is used as well as providing a source of fluid such as milk. Warm water is run over (or air is exposed to) the bottom of the package and the tempering channels of the package. The seal is removed from the top of the package after tempering and the frozen concentrate is released from the package into the blender. The frozen concentrate which is released conforms in shape to the compartments of the package. The fluid is then poured into the empty package to a predetermined mark so that the package becomes a measuring device for the fluid. The fluid is then delivered from the package into the blender and the blender is activated to mix a first measure of frozen concentrate released from the package with a second measure of fluid to make the drink of individual proportion.

The package design enables the package to be filled with the concentrate, in liquid form, with a single nozzle and the gutters enable the liquid concentrate to self-level. The liquid concentrate is then frozen to form a block of frozen concentrate in each compartment. At the commercial establishment, the preparer never touches the frozen concentrate or the fluid to be added (such as milk) so as to achieve a sanitary environment. The provision of multiple blocks of the frozen concentrate with defined edges causes directly from the package into the blender a rapid blending of the concentrate with the fluid to occur. The use of the package, after releasing the frozen concentrate, to also become the measuring container for the amount of fluid to be added to the blender eliminates the requirement for a separate container to act as a measuring device and the subsequent cleaning of that container in a sanitary environment. The same package can be utilized both for dispensing the frozen concentrate in a first measure and for measuring the fluid in a second measure. After use, the package is conventionally disposed of. The drink is quickly blended in an individual portion to achieve a finished product exhibiting an icy refreshing characteristic. The drink can also be quickly blended in a household environment with a household grade blender.

In summary, at the location of filling, the package of the present invention facilitates rapid product filling through use of a single nozzle and fast freezing of a self-leveled product through provision of a large heat exchange surface area. Furthermore at the location of use, the package of the present invention facilitates minimal tempering time, easy release or breakout of the frozen concentrate so as to achieve a rapid blend time in conventional home and commercial blenders.

SUMMARY OF THE INVENTION

A novel package for containing a frozen concentrate for use in quick blending a drink of individual proportion is disclosed. In the preferred embodiment, the package of the present invention has four substantially equally sized compartments and four dividers formed near the top of the package for separating the four compartments by a predetermined span. Four channels are formed under the dividers in the bottom of the package. The channels in conjunction with the bottom of the package provide a large surface are for rapid heat exchange so as to quickly temper the frozen concentrate in the package. A raised dome region is formed in the center of the package near the top and is integral with one end of each of the four dividers. The raised dome region rapidly disperses the product dispensed from a single dosing nozzle into each of the four compartments. A gutter formed in each divider causes the dispensed concentrate to overflow from the compartments so as to self-level in the package.

In a first novel method of the present invention, the package is thermoformed from a single sheet of plastic material into the configuration set forth above. A single nozzle simultaneously fills the compartments with the fluid concentrate of a predetermined measure. The single nozzle dispenses the concentrate over the raised dome region. The top of the package is sealed with a film. The sealed packages are then packed, palletized, and moved into a freezer such as a conventional blast freezer. The fluid concentrate which selflevels in the compartments by overflowing through the gutters is then quickly frozen.

In a second novel method, the frozen concentrate in the package is tempered by running warm water (or by exposure to air) over the bottom of the package and the tempering channels. The seal is removed from the top of the package and the tempered frozen concentrate is released into a blender. The frozen concentrate releases in the form of separate blocks which are substantially cubic in configuration. The emptied compartments of the package are then used as a measuring container to measure a predetermined amount of fluid for mixing with the concentrate. Once measured, the fluid is delivered from the package into the blender and the blender is activated to mix the first measure of concentrate with the second measure of fluid to blend a drink of individual proportion.

DETAILED DESCRIPTION OF THE INVENTION

1. Overview of Package 10—In FIG. 1, the quick blend frozen concentrate package 10 is shown holding a frozen product 20 such as a fruit concentrate. The package 10 has four formed compartments 30, substantially of equal size. Separating each compartment is a divider 40. Each divider 40 has a formed gutter 50 which provides fluid communication between the compartments 30. The gutters 50 provide self-leveling of product 20 when in liquid form as subsequently discussed. A lip 60 is formed around the periphery of the package 10 and provides a sealing surface area for the plastic film 70 sealing the compartments 30 containing the product 20. However, the film 70 does not seal on the dividers 40, facilitating easier opening and access to multiple compartments at once.

Figure 1:
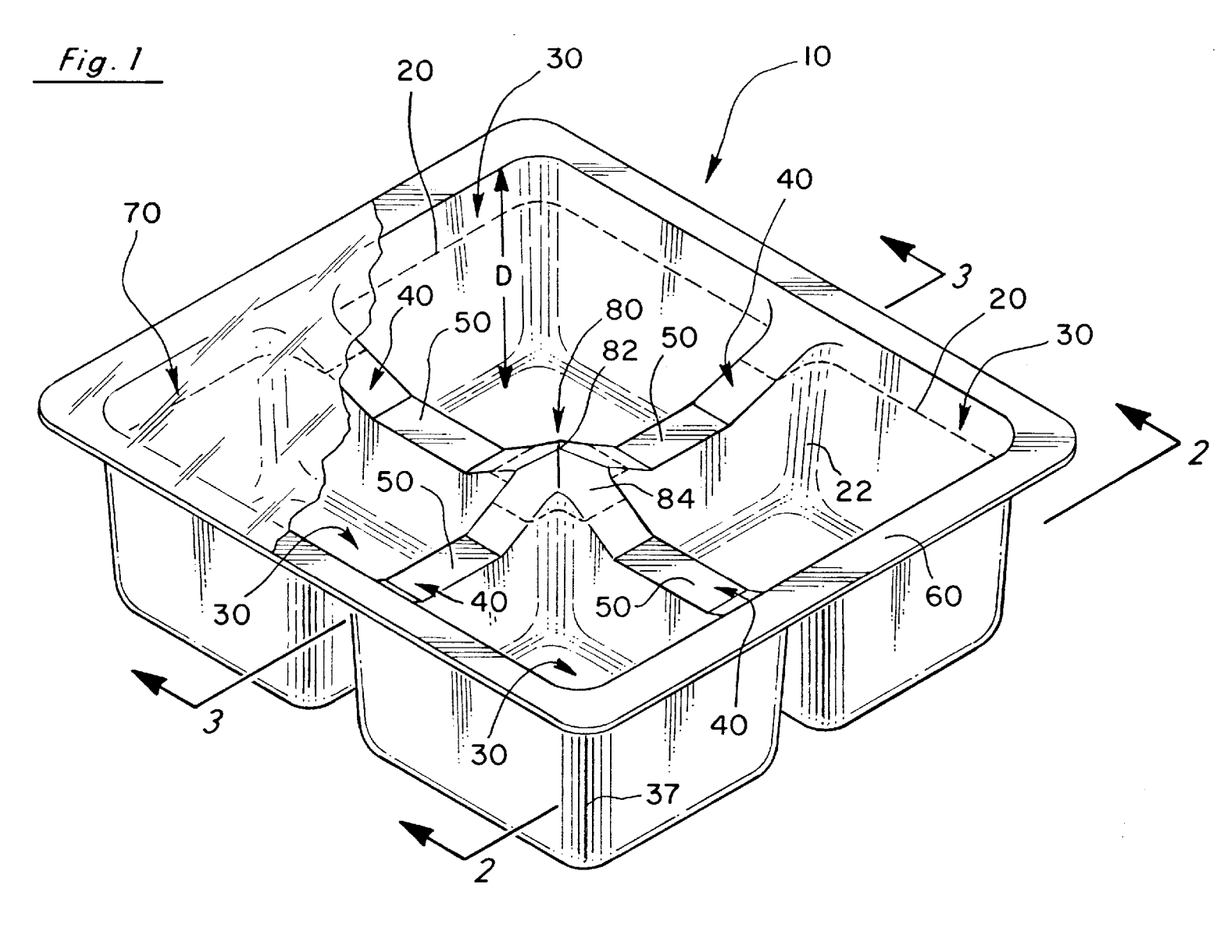
FIG. 1 sets forth a perspective view of the quick blend frozen concentrate package of the present invention.
Figure 2:
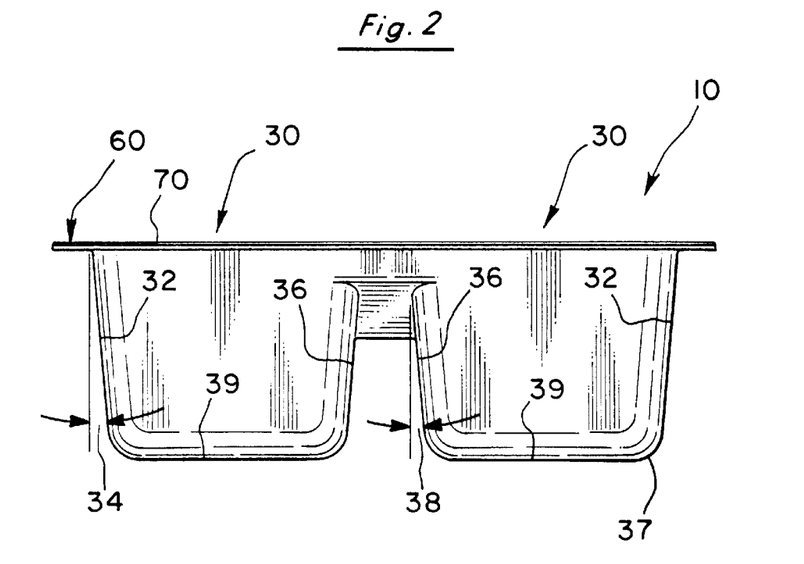
FIG. 2 is a side planar view of the package taken along lines 2—2 of FIG. 1.

Dividers 40 at one end form an elevated dome region 80 in the center of the package 10. The purpose of the dome region 80, as will be subsequently explained, is to permit a single dosing nozzle to dispense the product in fluid form for simultaneous delivery into each of the four compartments 30.

It is to be expressly understood that, under the teachings of the present invention, the number of compartments 30 could vary as well as the shape of the compartments 30. For example, three or five pie-shaped compartments could be formed around a central dome 80. In the preferred embodiment, and as shown in FIG. 1, the package 10 is substantially square in shape having substantially cube-shaped individual compartments 30. In the preferred embodiment of eight fluid ounces of frozen product, the periphery of the package can be square such as 4 to 5 inches on each side or rectangular such as 4 by 5 inches. Any suitable dimension can be used. The package has a typical depth D of about one inch to one and three-quarter inches. However, the package could be of any suitable geometric shape (such as circular) and could have three, four, or more compartments (such as pie-shaped) about the central dome.

2. Detail Construction of Package 10

In FIGS. 2–5, the details of the construction of the package 10 are set forth. Each compartment 30 has downwardly extending outer walls 32 at a slight angle 34. Each compartment 30 also has inner walls 36 that extend downwardly at a slight angle 38. These slight angles aid in releasing the package from the mold and in releasing the concentrate from the package. Each compartment 30 has a bottom wall 39 which is parallel to lip 60. The thickness of walls 32, 36, 39 can be between 1 to 40 mils. The walls 32, 36, and 39 engage each other in rounded relationship 37 (i.e., a radius at juncture). The compartments are substantially equal in size (i.e., volume). However, one compartment, not shown, may be modified to a some what smaller volume in the region of the pull tab for the film 70.

Figure 3:
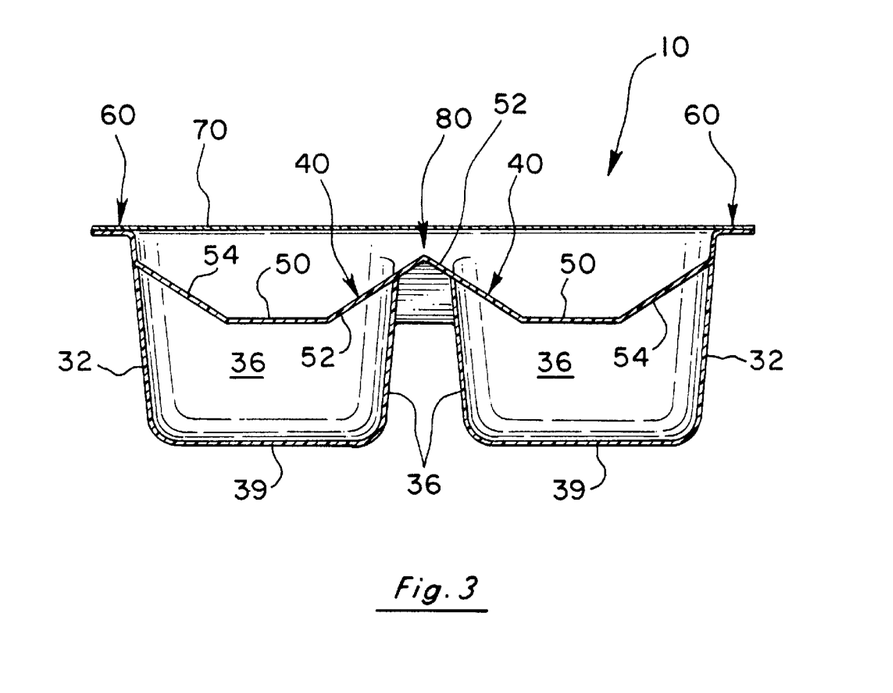
FIG. 3 is a cross-sectional view taken along lines 3—3 of FIG. 1.

The gutter 50, as shown in FIGS. 1 and 3, is a substantially flat portion disposed midway between the lip 60 and the dome 80. The gutter 50 is part of the divider 40. An angled region 52 at one end of the divider 40 integrally connects the gutter 50 to the dome 80 and the other angled region 54 at the other end of the divider 40 integrally connects the gutter 50 to the compartment outer wall 32 adjacent to lip 60. In the preferred embodiment the span S of the divider is at least ⅛ the width W of a compartment (as illustrated in FIG. 4).

Figure 4:
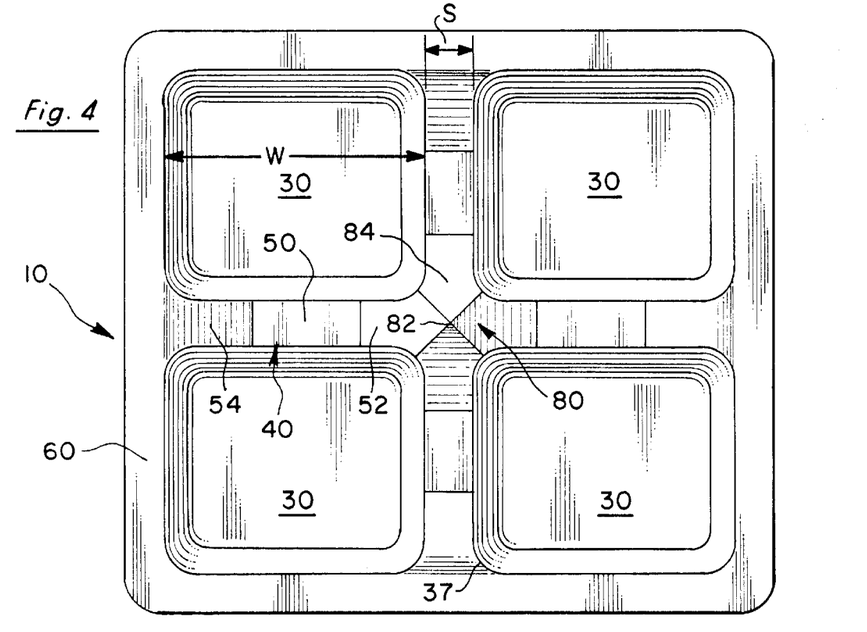
FIG. 4 is a top planar view of the package of FIG. 1.

In FIG. 4, the top view of the package 10 is shown. The lip 60 is formed around the outer periphery of the package 10 and provides the seal area for the plastic film 70. As shown in FIG. 3, the film 70 only seals on the lip 60 and does not seal on the dividers 50 or on the dome 80. The dome 80 has a center point 82 and four sides 84 that cause the dome 80 to be in the shape, as shown in FIG. 1, of a pyramid (or a wedge-shape). It is to be expressly understood that although a pyramidal shape is shown in the preferred embodiment, that any suitable shape such as a cone could also be utilized.

Figure 5:
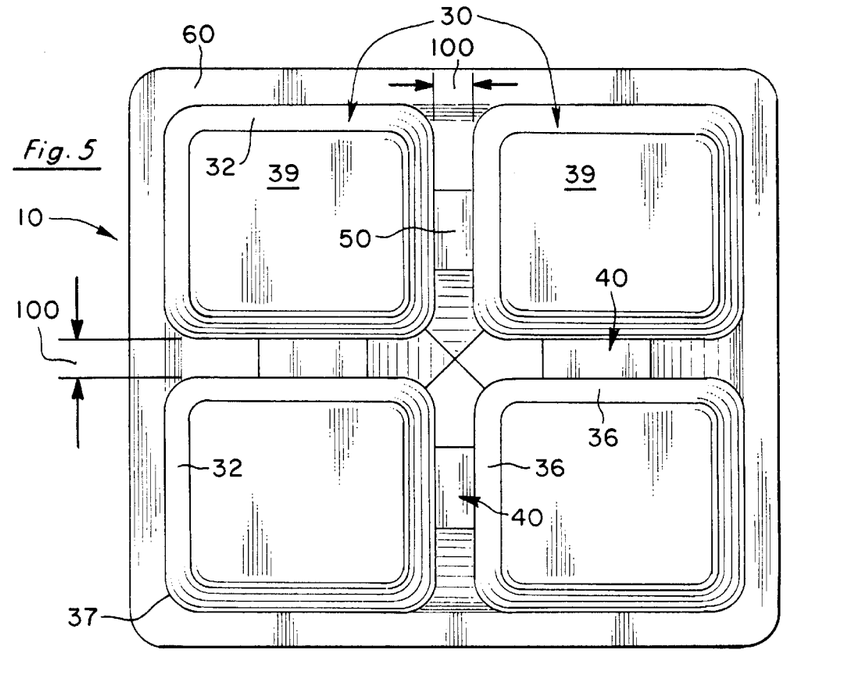
FIG. 5 is bottom planar view of the package of FIG. 1.

In FIG. 5 which is a bottom view of the package 10, the compartments 30 are spaced apart to form channels 100 under the dividers 40. This spacing 100 of the compartments 30 as well as the bottoms 39 of the compartments 30 together provide a large surface area that allow the frozen product, as will be subsequently explained, to be rapidly tempered so that the product can be removed from the package 10. These channels 100 also aid in the rapid freezing of the product within the package 10.

Figure 13:
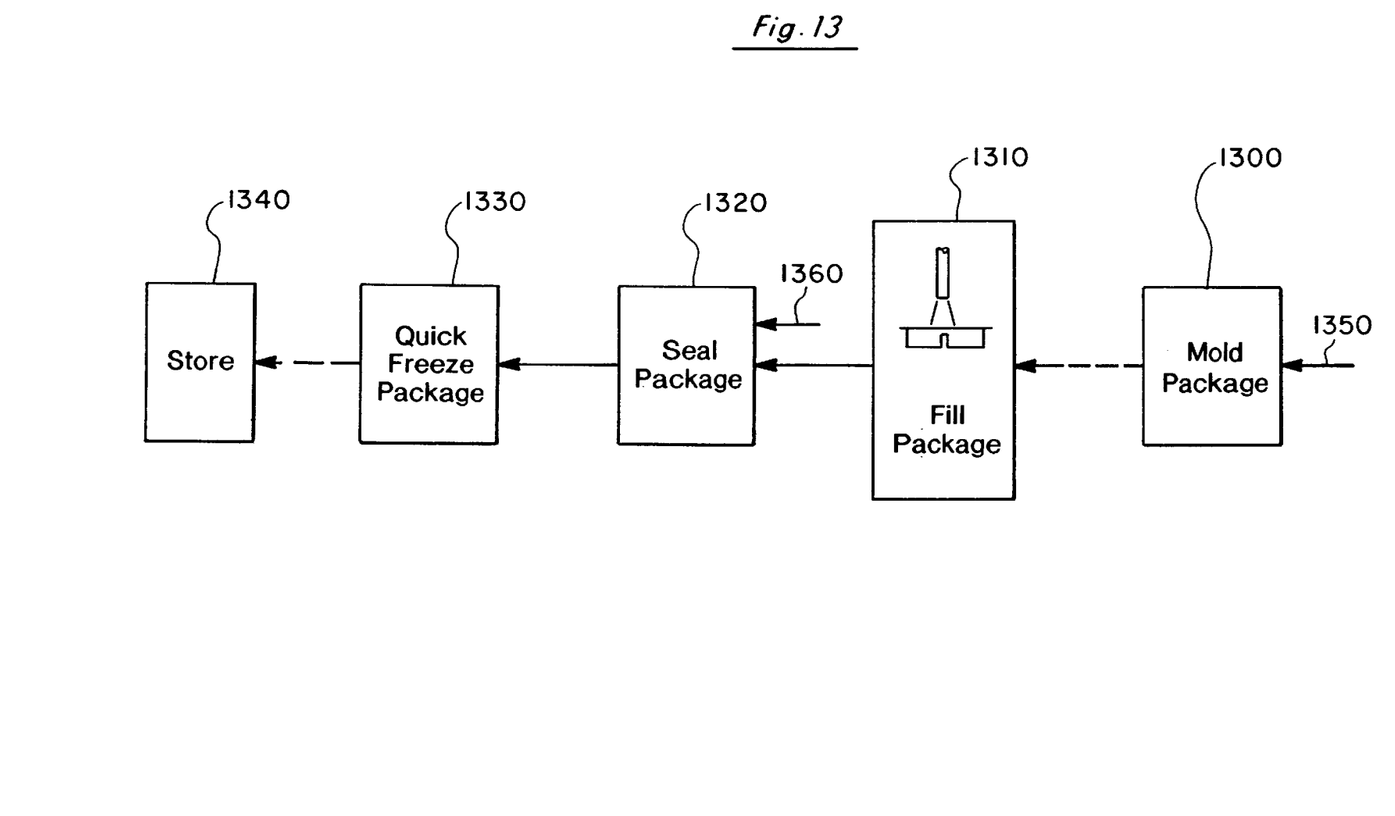
FIG. 13 illustrates the filling of the package of FIG. 1 with concentrate.

The package 10 can be conventionally thermoformed from any suitable plastic material such as polyethylene, polystyrene, polypropylene, or polyester. In FIG. 13, a sheet of plastic material 1350 is fed into a conventional thermoforming process for molding the package 10. The formed package is then filled 1310 with product such as a fruit concentrate in fluid form. A thin film plastic sheet 1360 is then fed in a conventional package sealing process 1320 to seal the package 10 with film 70. The sheet 1360 of film may be applied to surface 60 by heat or pressure or both, then cut to provide separation. The sealed package is stacked, palletized and delivered to a conventional quick freeze process 1330 for freezing. The gutters 50 always insure the liquid product to be self-leveled prior to freezing. It is to be expressly understood that the gutters 50 may take on any desired shape or style. After freezing the frozen product in the package 10 can be stored 1340.

It is to be expressly understood that the package may be conventionally molded by a number of different processes. For example, the package 10 could be preformed such as by injection molding or by thermoforming.

3. Filling Package 10 with Product 20

Figure 6:
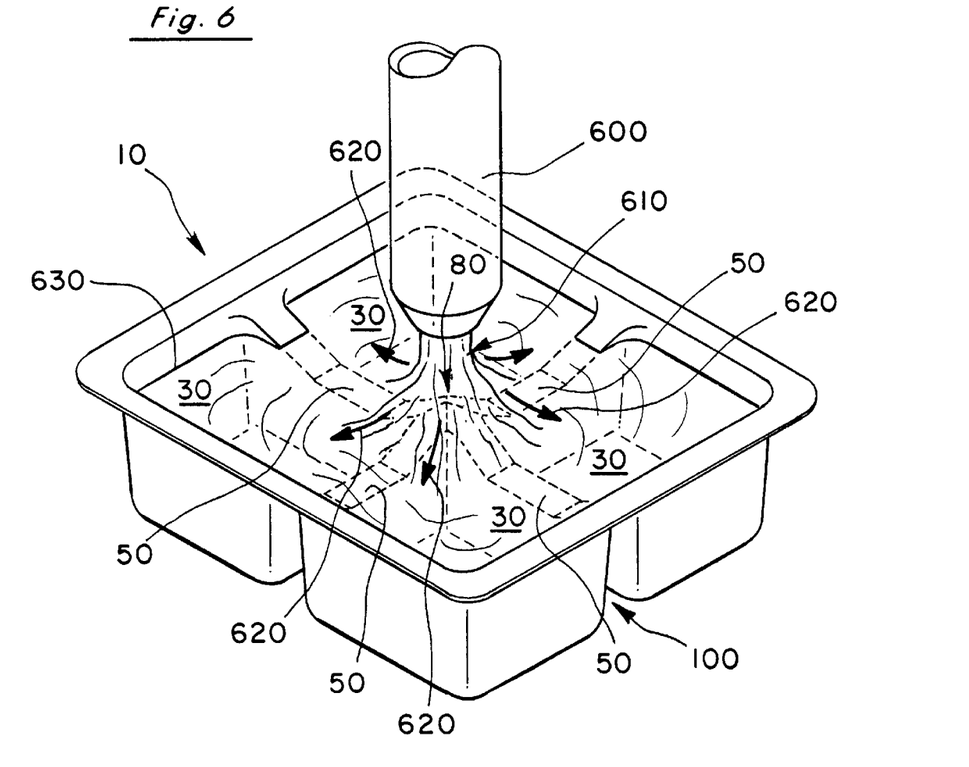
FIG. 6 is an illustration of the dispensing of the concentrate, in liquid form from a single nozzle over the dome of the package of FIG. 1 to simultaneously fill each compartment.

In FIG. 6, an illustration is set forth showing a single dosing nozzle 600 dispensing the product fluid 610 directly over the dome 80. The arrows 620 show the concentrate fluid 610 being delivered into the four compartments 30 uniformly. By directly impacting the dome 80 with the product fluid 610 all four compartments 30 in the tray 10 are substantially simultaneously filled with only one dosing nozzle 600. This differs from prior approaches which use one nozzle 600 for each compartment 30. In the preferred embodiment, a predetermined measure of about eight fluid ounces of product fluid 610 is delivered from the nozzle 600 and rapidly dispenses into the four compartments 30. This results in four "two fluid ounce" blocks. It is to be understood that any product measure could be suitably used such as in the four to sixteen ounce range based upon the requirements for the drink (or drinks), and the number of compartments. The final fluid level 630 is obtained which is above the level of the gutters 50. Hence, through the rapid dispensing of the fluid 610 by the nozzle 600 over the dome 80, all four compartments 30 are filled and a uniform level 630 is obtained by action of the gutters 50 to exchange overflow between compartments. The use of a single dosing nozzle provides more accurate weight control over the dispensed product.

In a typical manufacturing line, the packages are filled at a rate of about 60 to 90 packages per minute. The packages 10 are thermoformed from a sheet of plastic in a conventional fashion. After filling, the filled package is hermetically sealed with the ez-peel film 70. The sealed package is then delivered to a freezing station where the self-leveled fluid concentrate is quickly frozen to a temperature of usually −20° F. to −0° F.

The ability to fill compartments 30 of the package 10 of the present invention through use of one dosing nozzle is a major feature of the present invention. The product fluid 610 is disseminated into the compartments 30 evenly. If four filler heads were used (one for each compartment), the capital equipment expense to produce a given volume of the product would be substantially greater. Additionally, each nozzle 600 has a measure (or dose) tolerance (volume, percentage, or weight) which is usually ±2%. Because of these tolerances, the use of four nozzles would increase product giveaway (i.e., that amount of product which is added over the stated package amount to ensure compliance with applicable governmental regulations and customer expectations). By utilizing one dosing nozzle for the entire volume of four compartments, the product giveaway is substantially reduced.

In summary, the use of the dome 80 not only enables the use of one nozzle, but also speeds up the delivery of the liquid concentrate into the compartments in a high speed manufacturing line.

4. Making a Blended Drink

A goal of the present invention is to mass market individual portions of "smoothies" based upon the fruit being in a frozen concentrate contained within package 10 which is blended in a blender with milk. This invention can be used for other drinks using a frozen product and a fluid such as a margarita (i.e., a frozen mix and tequila).

Figure 7:
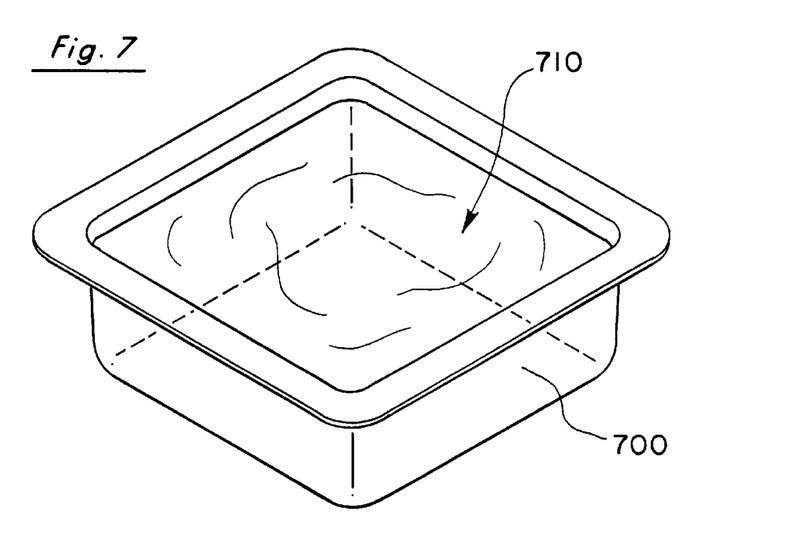
FIG. 7 illustrates a package containing a single block of frozen concentrate which is not part of the present invention.
Figure 8:
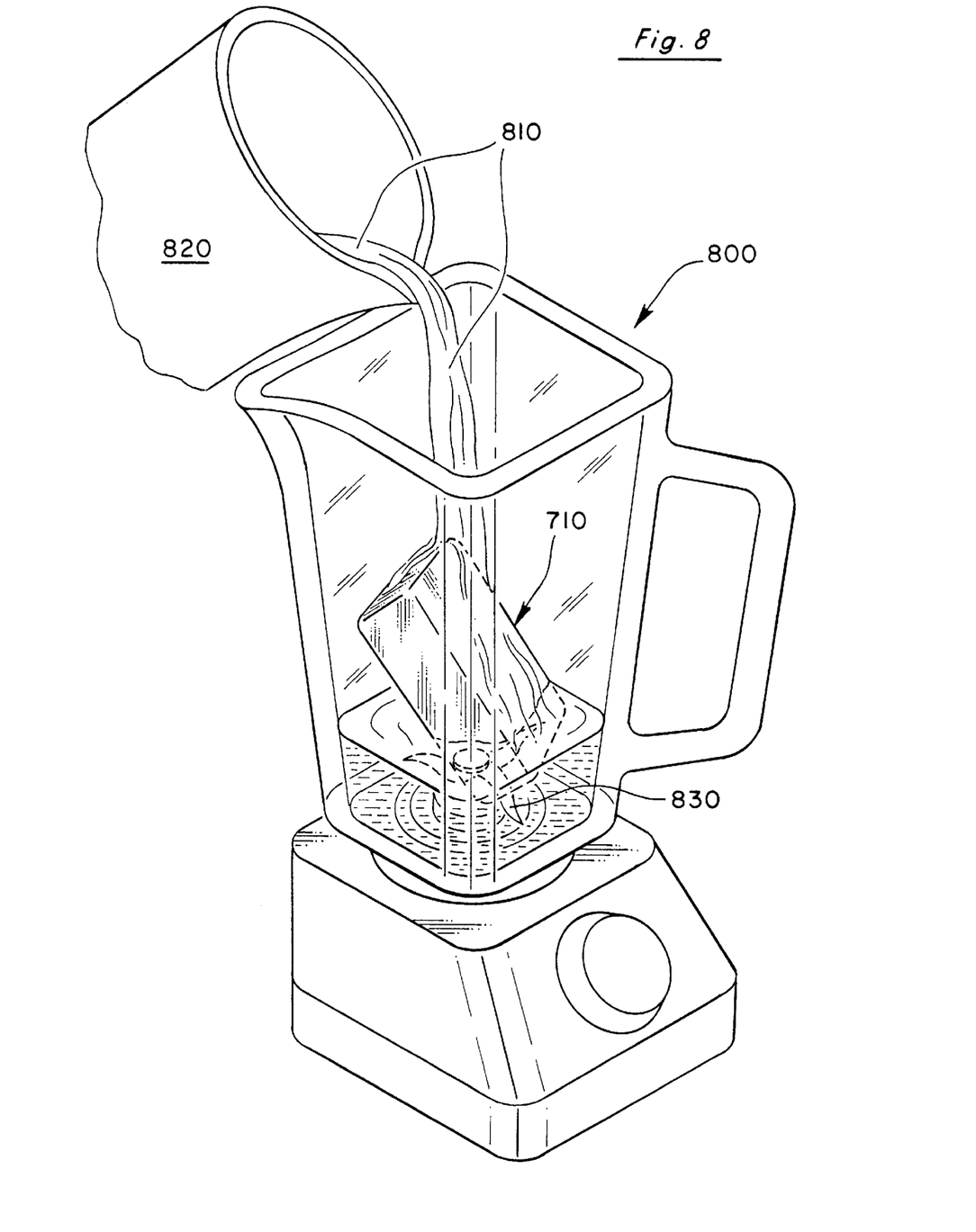
FIG. 8 sets forth the blending of a single block of frozen concentrate of FIG. 7 with a fluid such as milk.

In FIG. 7, a six fluid ounce tray 700 was used by the inventor as well as a block of concentrate formed in a round cup to contain the frozen fruit concentrate at 0° F. to 5° F. This resulted in a large frozen block of concentrate 710 which was placed into a blender 800 as shown in FIG. 8. In the preferred embodiment, an equal measure of milk 810 was dispensed from a container 820 to blend with the frozen concentrate 710. This approach took a long time to blend (1 to 2 minutes) because of the time it took for the blades 830 of the blender to break down the large block 710 of concentrate. Another problem with the large block 710 is that the thermal gradients are much greater since the center of the block 710 is at a much colder temperature. The package 10 would be stored at a warehouse at, for example, −20° F. creating a very cold core temperature even after tempering to 0° F. to 5° F. at the commercial location. Indeed, because a single large frozen block 710 was utilized, portions of the resulting blended drink were over-blended and portions were under-blended creating a frothy creamy top with ice chunks in the final drink. Such a drink does not have consumer appeal.

It was discovered that rather than having the single block 710, four separate and smaller cubes of frozen concentrate provided a three to four times decrease in blend time in comparison to the single block 710 approach (for example 15 seconds versus 1 minute for six fluid ounces of concentrate and six fluid ounces of milk). This rapid blend time (about 400% faster) results not only from providing four smaller frozen blocks of the product, but also providing defined edges to the blocks as will be explained subsequently.

The method of operation of the present invention to make a drink of individual portion is shown in FIGS. 9–12.

Figure 9:
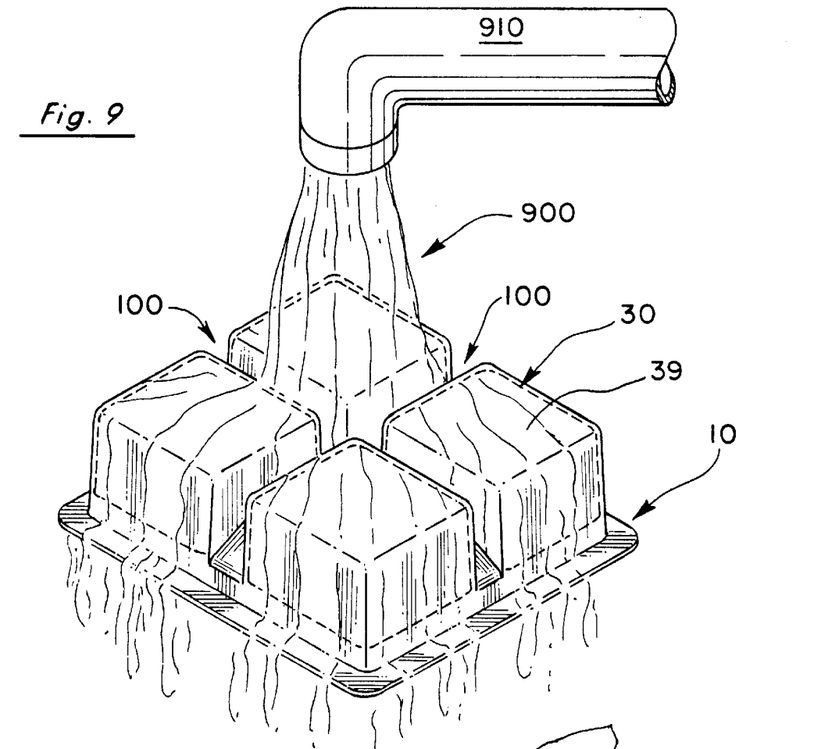
FIG. 9 sets forth tempering the frozen concentrate in the package of FIG. 1.

In FIG. 9, the package 10 containing the bottom of the product 20 is placed under a stream of warm water 900 from a faucet 910. This rapidly tempers the frozen product 20 to a range of about 0° F. to 5° F. The speed of tempering is aided by the provision of the channels 100 and the large surface area provided by the bottom 39 and the sides 32 and 36 of the compartments 30. The warm water flows through the channels 100 and over the bottoms 39. The channels 100 provide a large surface area for the warm water to contact thereby allowing for rapid tempering of the product. In the preferred embodiment the channels are deep (i.e., at least half the depth D of the compartment 30) which with the above depth dimension of 1 ½ inches would be a channel depth of at least ¾ inch. This also facilitates breakup and removal of the product from the package. It is to be expressly understood that while warm water is illustrated in FIG. 9, that any suitable warm flow such as warm air (e.g., from a heated blower) could also be used for tempering.

Figure 10:
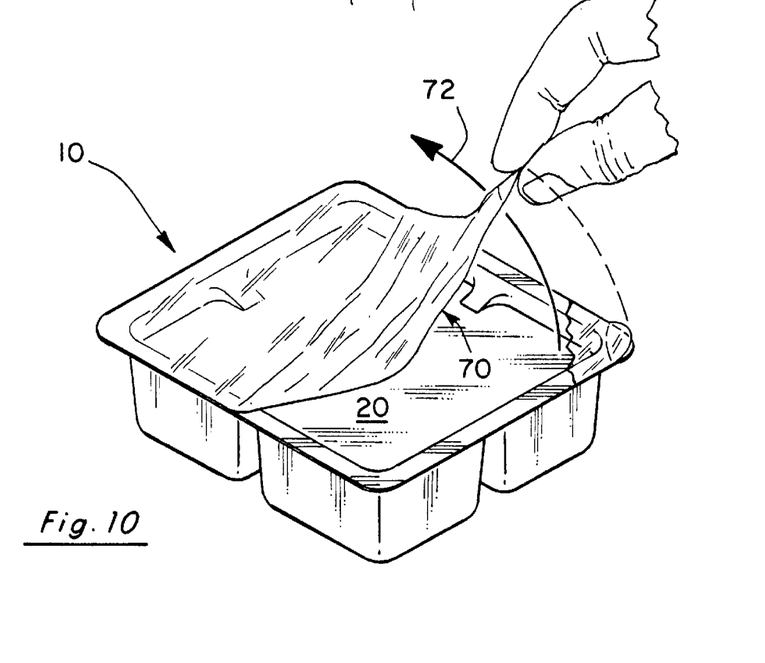
FIG. 10 sets forth the step of removing the plastic film to unseal the package of FIG. 1.

After tempering, and as shown in FIG. 10, the plastic film 70 is removed by lifted at an edge of the film upwardly in the direction of arrow 72 in order to unseal the frozen concentrate 20 from the package 10.

Figure 11:
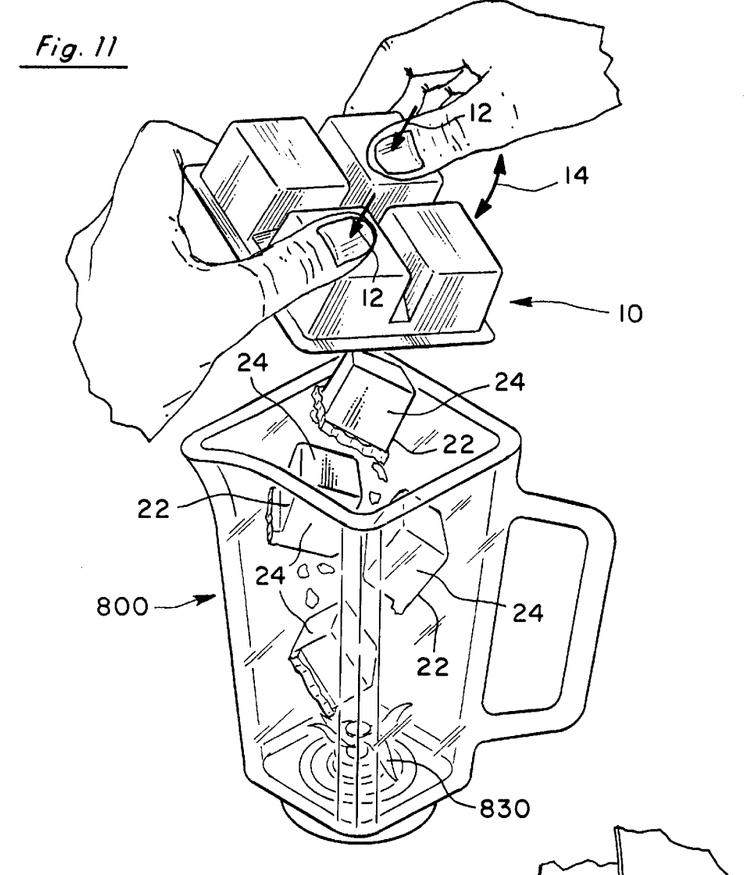
FIG. 11 sets forth the step of releasing the frozen concentrate from the package of FIG. 1.
Figure 12:
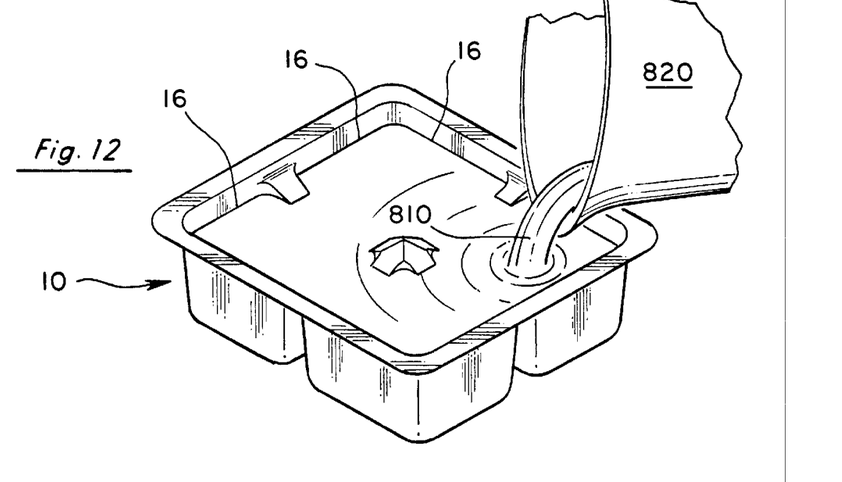
FIG. 12 sets forth the step of measuring fluid from a source container (such as milk from a carton) into the package of FIG. 1.

After unsealing and as shown in FIG. 11, the product 20 is released from the package 10 by either applying pressure with the fingers or thumb of the preparer or by twisting the package in the direction of arrow 14. Either action causes the tempered product 20 to pop out in blocks 24 and into the blender 800.

The package 10 is then used as a measuring device for the amount of milk (or other fluid) to be added to the blender 800. A suitable mark 16 is placed on the edge of the compartment 30 at a predetermined level so that the user can fill the milk 810 to the desired level 16. This level 16 can appear at various places around the package 10 to make it easy for the user to obtain the precise measure for the amount of milk 810. In the preferred embodiment of a smoothie, the same amount of milk is added as frozen concentrate so that the predetermined mark would be at the same level as the frozen concentrate. It is to be understood that this is based on the requirements for the resulting drink which in the case of an alcoholic drink could be a lower measure for the fluid 810. The mark 16 can be at any desired level.

In a busy store location where large numbers of the drink of the present invention are ordered, the amount of time it takes the preparer to remove the package 10 from a freezing unit (not shown), temper it, release it from the package, measure and put the milk into a blender, and do the mixing becomes critical. This is an important part of the present invention since the compartmental design with the channel spacings and large surface areas speed up product tempering by providing a greater area available for heat exchange. This structural advantage also evens out temperature differences and product storage which can also vary widely. This particular design, providing a large surface area for tempering, allows for faster tempering compared, for example, to the traditional cylinder of juice found in retail outlets or the package design of FIG. 7.

In addition, the compartmental design of the present invention as shown in FIG. 11 provides for easy release of the product from the package. Because the product 20 is broken out into the blender into a grouping of four substantial cubical shapes with 24 defined edges 22 (FIG. 11), the blending time, as indicated above, decreases about three to four times over the block 710 shown in FIG. 7. First, the present invention provides a plurality of smaller blocks 24 for the frozen concentrate 20 rather than the single block 710 of FIG. 7. While the preferred embodiment, sets forth a substantially cube-shaped block 24, the blocks 24 could also be pie-shaped. Secondly, the present invention provides defined edges 22 to each block 24. The defined edges provide better engagement with the blades 830 of the blender 80 so that the blocks 24 are chipped away faster. Round surfaces such as those conventionally found on 6–16 oz. cylindrical containers of frozen juice or spiral wound containers take longer to chip away. For purposes of clarity, "defined edges" are those edges 22 illustrated in FIG. 11 that are formed from intersecting planes. The edges 22 may or may not have rounded corners 37 of minimal radius at the line of intersection.

The rapid tempering time results in improved product characteristics associated to produce an icy refreshing drink of a traditionally prepared smoothie versus the frothy creamy with ice chunks experience of FIGS. 7 and 8.

Furthermore, the sealed package 10 of the present invention allows sanitary preparation of the finished product in individual portion sizes. At no time does the preparer touch frozen concentrate or the fluid. The size of the package 10 is designed to quick blend drinks of uniform individual portion size and of uniform quality. Furthermore, no other utensils are utilized other than the blender and the package to prepare the drink resulting in a safer working environment.

It is to be expressly understood that the package of the present invention and the method of drink preparation set forth above could be utilized in the home environment. The package 10 could be sold in a retail store and used by a person to make a blended drink at home with a conventional home blender.

It is also to be expressly understood that a drink or drinks could be made from a package of concentrate depending on the size of the package and/or the size of the drink.

The invention has been described with reference to the preferred embodiment. Modifications and alterations will occur to others upon a reading and understanding of this specification. It is intended to include all such modifications and alterations insofar as they come within the scope of the appended claims or the equivalents thereof.

I claim:

1. A combination of a package for containing a food product and dispenser means for filling said package with said food product, said dispenser means having a single nozzle wherein said food product is dispensed from said single nozzle onto said package;

said package in the combination with said dispenser means comprising:

a plurality of compartments extending about the center of the package, a plurality of dividers formed in the package separating the plurality of compartments by a predetermined span, each divider having ends spaced from each other and having a gutter formed therein, and a raised dome region formed in the center of the package, said dome region being integral with one end of each of said dividers, said dome region sloping downwardly and outwardly from the center of said package toward the respective dividers, said dome region of said package of said combination being positioned beneath said single nozzle of said dispenser means to receive food product therefrom wherein said food product dispensed through said single nozzle directly impacts said downwardly and outwardly sloping dome region in the center of said package to simultaneously deliver said food product into each of said plurality of compartments around said dome region with each gutter formed in each divider causing the delivered food product to self-level in all of said plurality of compartments.

2. The combination of claim 1 wherein said compartment are equal in size.

3. The combination of claim 1 wherein each of said compartments is cube-shaped.

4. The combination of claim 1 wherein said predetermined span of each of said dividers is a flat surface, said predetermined span being at least $\frac{1}{8}^{th}$ the width, W, of a compartment.

5. The combination of claim 1 wherein the dome region is pyramidal in shape.

6. The combination of claim 1 wherein the gutter is in the center of each divider.

7. The combination of claim 1 wherein said package has a square periphery.

8. The combination of claim 1 wherein each of said compartment has angled sides so as to permit release of product from the respective compartments.

9. The package of claim 1 wherein said package comprises four compartments and four dividers with each said gutter located in the center of each respective divider.

10. The combination package of claim 1 further comprising a predetermined mark in at least one of said compartments for indicating a fluid level.

11. A combination including:

a package for containing a food product, said package comprising a plurality of compartments extending about the center of said package with a plurality of dividers formed in the package separating the plurality of compartments by a predetermined span, each divider having ends spaced from each other and having a gutter formed therein, and a raised dome region formed in the center of the package, said dome region being integral with one end of each of said dividers, said dome region sloping downwardly and outwardly from the center of said package toward the respective dividers, and said combination further including means for dispensing food product centrally onto said downwardly and outwardly sloping dome region in the center of said package to be simultaneously delivered into each of said plurality of compartments with each gutter formed in each divider causing the delivered food product to self-level in all of said plurality of compartments.

12. The combination of claim 11 wherein the gutter is in the center of each divider.

13. The combination of claim 11 wherein said dispensing means is a single nozzle.

* * * * *